United States Patent [19]

Blackman

[11] Patent Number: 5,535,062
[45] Date of Patent: Jul. 9, 1996

[54] MAGNETIC READING AND/OR RECORDING APPARATUS FOR READING AND/OR RECORDING INFORMATION ON A MAGNETIC INFORMATION TRACK ON A PHOTOSENSITIVE MEDIUM

[75] Inventor: Robert J. Blackman, Rochester, N.Y.

[73] Assignee: Eastman Kodak Company, Rochester, N.Y.

[21] Appl. No.: 837,225

[22] Filed: Feb. 18, 1992

[51] Int. Cl.$^6$ .................. G03B 51/00; G11B 5/633
[52] U.S. Cl. ............................ 360/3; 360/104
[58] Field of Search .................. 360/3, 75, 104; 226/21, 91, 196, 198, 199; 271/240

[56] References Cited

U.S. PATENT DOCUMENTS

| | | | |
|---|---|---|---|
| 3,198,889 | 8/1965 | Eulberg | 360/104 X |
| 3,902,797 | 9/1975 | Thomas | 352/29 |
| 4,628,386 | 12/1986 | Chabrolle | 360/104 |
| 4,663,687 | 5/1987 | Dalziel | 360/130.31 X |
| 4,811,143 | 3/1989 | Ohashi et al. | 360/130.2 |
| 4,933,780 | 6/1990 | Wash et al. | 360/1 |
| 4,947,196 | 8/1990 | Wash et al. | 354/76 |
| 5,034,836 | 8/1991 | DenMarti et al. | 360/104 |
| 5,041,933 | 8/1991 | Delharti et al. | 360/104 |

FOREIGN PATENT DOCUMENTS

| | | |
|---|---|---|
| 0372192 | 6/1990 | European Pat. Off. . |
| 0433019 | 6/1991 | European Pat. Off. . |

Primary Examiner—Aristotelis Psitos
Assistant Examiner—Patrick Wamsley
Attorney, Agent, or Firm—David A. Howley

[57] ABSTRACT

A magnetic reading and/or recording apparatus for reading and/or recording information from/on a magnetic information track on a web comprises a magnetic reading and/or recording element and a flexible member for supporting the magnetic reading and/or recording element for rotation about an axis perpendicular to a longitudinal axis of the web while restraining the magnetic reading and/or recording element from rotating about an axis parallel to the longitudinal axis of the web and an axis in a direction transverse to the longitudinal axis of the web. The magnetic reading and/or recording apparatus further includes a second flexible member for supporting the magnetic reading and/or recording element for movement in a direction transverse to the longitudinal axis of the web while restraining movement of the magnetic reading and/or recording element in a direction perpendicular to the longitudinal axis of the web and in a direction parallel to the longitudinal axis of the web, and for supporting said reading and/or recording element for rotation about the axis perpendicular to the longitudinal axis of the web.

1 Claim, 3 Drawing Sheets

MAGNETIC READING AND/OR RECORDING APPARATUS FOR READING AND/OR RECORDING INFORMATION ON A MAGNETIC INFORMATION TRACK ON A PHOTOSENSITIVE MEDIUM

CROSS-REFERENCE TO RELATED APPLICATIONS

Reference is made to commonly assigned copending application U.S. Ser. No. 837,052, entitled MAGNETIC READING AND/OR RECORDING APPARATUS FOR USE WITH PHOTOSENSITIVE MEDIUM, and filed Feb. 18, 1992 in the name of R. H. Kiesow.

Reference is made to commonly assigned copending application U.S. Ser. No. 701,727, entitled MAGNETIC HEAD-TO-RECORDING MEDIUM SUPPORT APPARATUS, and filed May 17, 1991 in the name of J. G. Weigand, R. J. Blackman and F. C. Long.

FIELD OF THE INVENTION

The present invention relates generally to the field of magnetic reading and/or recording apparatus and more particularly to a mechanism for supporting a magnetic reading and/or recording element.

BACKGROUND OF THE INVENTION

In general, proper registration should be maintained between a magnetic reading and/or recording element and a web having a magnetic information track thereon to obtain or place accurate information from or on the magnetic information track. Conventionally, magnetic reading and/or recording elements are supported by springs allowing three or more degrees of freedom of movement. It is not always necessary to have a magnetic reading and/or recording element which has three degrees of freedom, therefore springs that allow the magnetic reading and/or recording elements to gimbal with three degrees of freedom can be costly and complex, thus difficult to manufacture.

SUMMARY OF THE INVENTION

According to the invention, a magnetic reading and/or recording apparatus comprises a magnetic reading and/or recording element and means defining an x-, y-, z-axis system for supporting the magnetic reading and/or recording element for rotation about one of the axes while restraining the magnetic reading and/or recording element from rotating about the other axes, wherein the x-axis and the y-axis are perpendicular to each other and the z-axis is perpendicular to the x- and y-axes.

Thus, a low cost mechanism for supporting magnetic reading and/or recording element can be easily manufactured. Furthermore, the magnetic reading and/or recording element is supported to maintain proper registration between the magnetic reading and/or recording element and a web having a magnetic information track coated thereon.

BRIEF DESCRIPTION OF THE DRAWINGS

Other advantages of the invention will become apparent from the following description taken in connection with the accompanying drawing wherein.

DESCRIPTION OF THE PREFERRED EMBODIMENT

Figure 1:
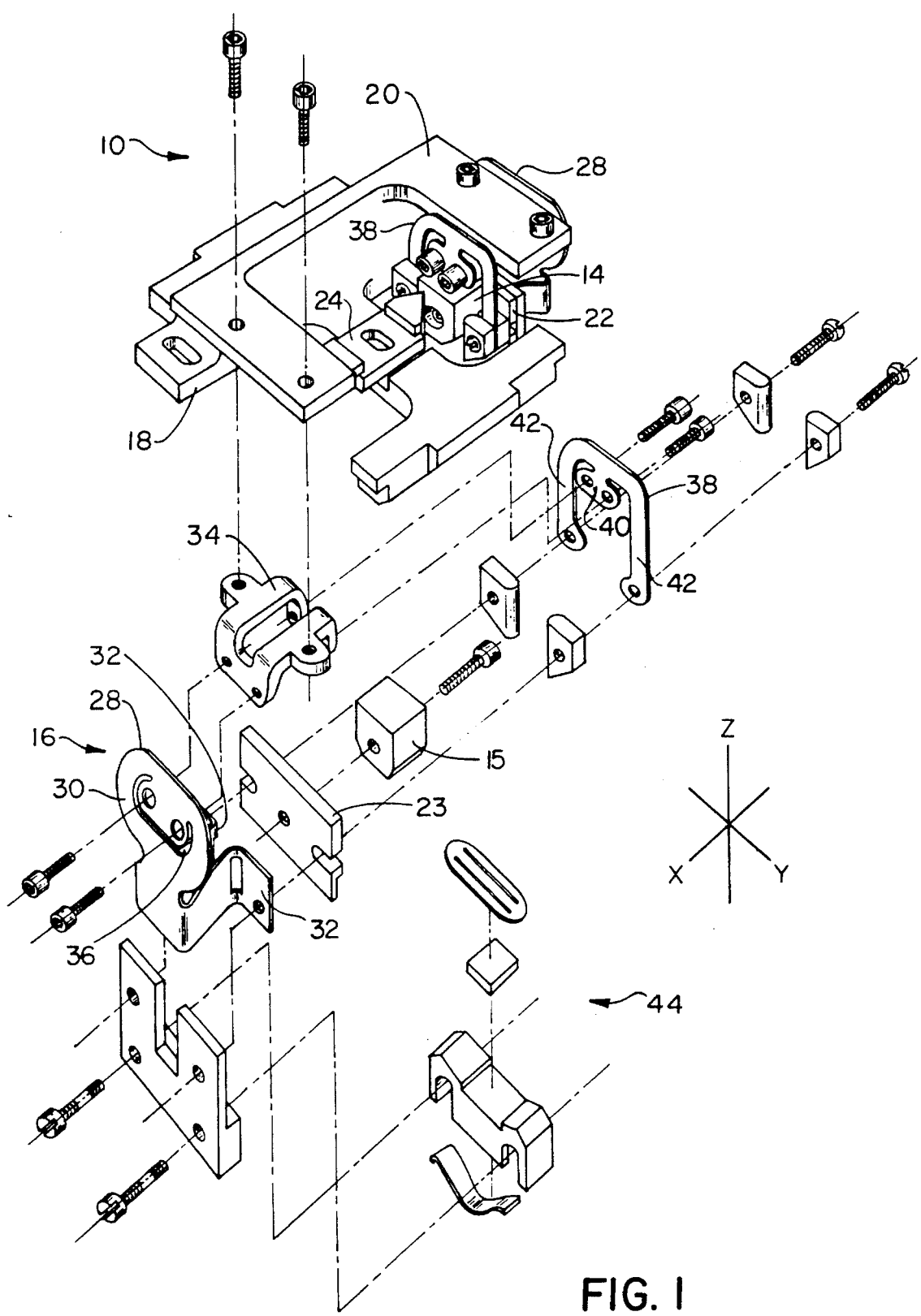
FIG. 1 is an exploded view of a magnetic reading and/or recording apparatus in accordance with the present invention.

Referring now to the drawings and in particular to FIGS. 1 and 2, a magnetic reading and/or recording apparatus 16 having a web guiding device 10 for directing a web 12 to a magnetic reading and/or recording element 14 in the magnetic reading and/or recording apparatus 16 is shown. The web 12 may be a conventional magnetic tape or it may be a photosensitive medium, film or paper, having a virtually transparent magnetic coating covering the non-emulsion side of the photosensitive medium, herein referred to as film 12. It is not intended that the present invention be limited in any manner to any specific type of photosensitive medium or process. The mediums used in the illustrations are solely for purposes of illustration.

The web guiding device 10 includes means defining an entrance 18 for accepting the film 12 into the magnetic reading and/or recording apparatus 16. The magnetic reading and/or recording apparatus may be part of a conventional recording and/or playback appliance such as a tape recorder or may be part of a photographic apparatus such as a photographic printer, processor, or camera. According to a preferred embodiment, the entrance 18 is defined by a housing 20.

The preferred embodiment includes edge following means 22, referred to as an edge follower, attached to the magnetic reading and/or recording element 14 for tracking a longitudinal edge of the film 12 as it is moving along a defined path to maintain proper registration between the magnetic reading and/or recording element 14 and a magnetic information track on the film 12. The edge follower 22 is located initially in the defined path. A forward leading edge 21 moves the edge follower 22 to a variable tracking position tracking the longitudinal edge of the film 12 when the film 12 enters the magnetic reading and/or recording apparatus.

Figure 2A:
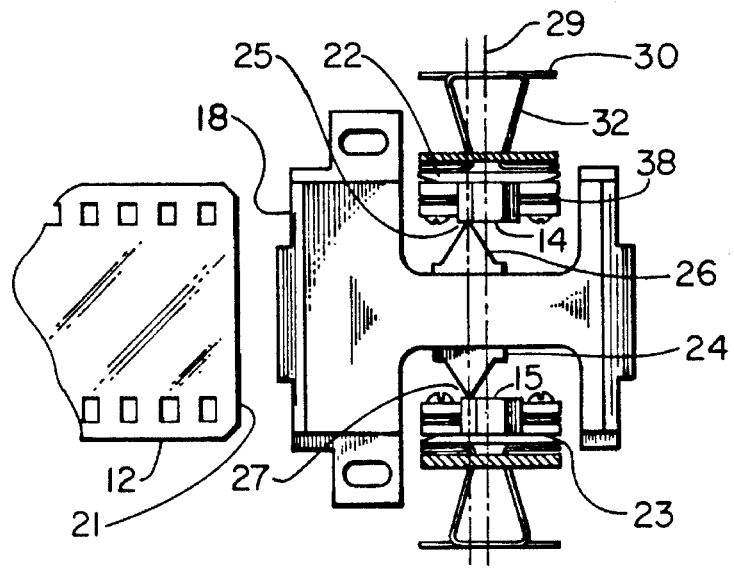
FIGS. 2A, 2B, 2C are plan views showing a web entering and traveling through the magnetic reading and/or recording apparatus.
Figure 2B:
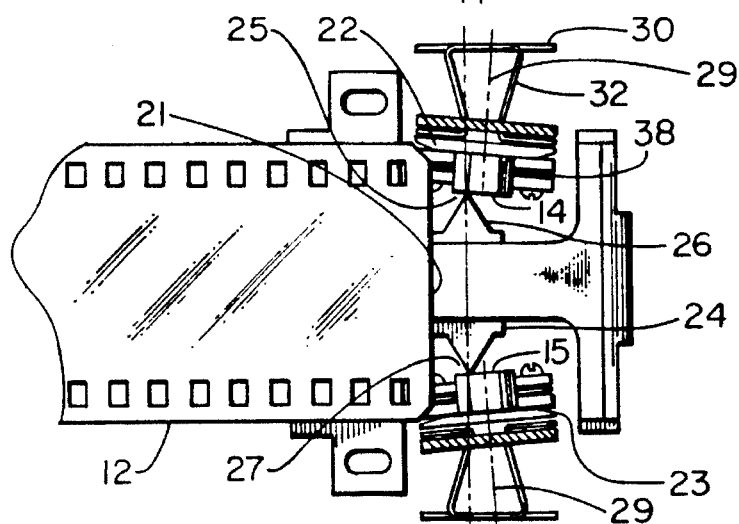
Figure 2C:
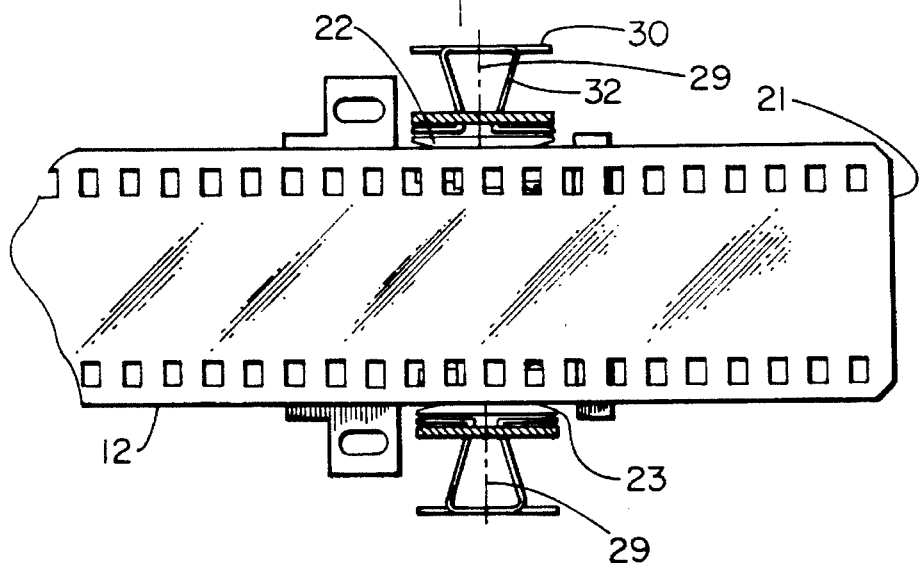
Figure 3:
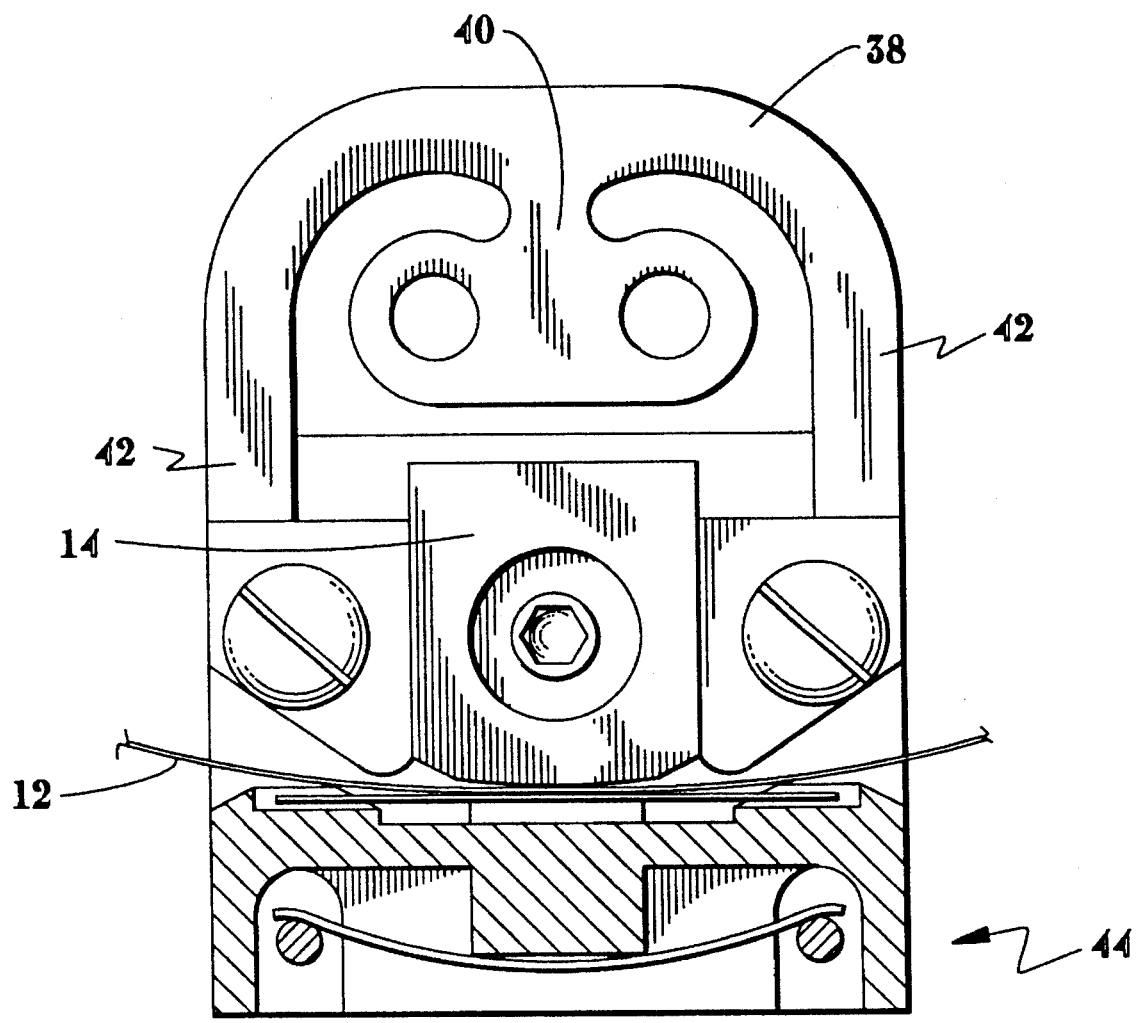
FIG. 3 is a partial section view of a magnetic reading and/or recording element and its respective backer apparatus.

The edge follower 22 is capable of pivoting between a first position parallel to the longitudinal edge of the film 12 as seen in FIG. 2A and 2C and a second position angled towards the entrance 18 as seen in FIG. 2B. The edge follower 22 is supported for pivotal movement between the first and second positions by a member 24 having at least one pointed end 26. The member 24 is attached to the housing 20 by any conventional means. In the preferred embodiment, the pointed end 26, about which the edge follower 22 pivots, contacts the magnetic reading and/or recording element 14 at a point 25 remote from a center point 29 of the magnetic reading and/or recording element 14 towards the entrance 18 as best seen in FIGS. 2A–C. Of course, the pointed end could contact the edge follower 22 as long as the contact point is remote from the center point of the magnetic reading and/or recording element 14 and is towards the entrance. It is advantageous having the contact point off center, as opposed to being centered, because the apparatus will have more of a tendency to to automatically pivot about the point 25.

It should be obvious to one skilled in the art that the edge follower could pivot about a point located between the center point of the magnetic reading and/or recording element and an exit and achieve a similar result. In this situation, the edge follower could be supported by a biasing means located so that the biasing means biases an end of the edge follower towards the longitudinal edge of the film.

The preferred embodiment represented in FIG. 2 shows that the leading edge of the film has tapered corners. Furthermore, the preferred embodiment includes tapered edges on the edge followers. These features aid in the movement of the leading edge of the film into the magnetic reading and/or recording apparatus, however they are not required.

The member 24 in the preferred embodiment includes a second pointed stop 27 at an opposite end of the member 24 for supporting a second magnetic reading and/or recording element 15 located directly opposite the other magnetic reading and/or recording element 14 along an opposite longitudinal edge of the film 12.

Referring back to FIG. 1, the edge follower, which is attached to the magnetic reading and/or recording element 14, is attached to the housing 20 by a first flexible member 28. This flexible member 28 supports the magnetic reading and/or recording element 14 for rotation about a z-axis while restraining the magnetic reading and/or recording element 14 from rotating about an x-axis and a y-axis, wherein the x-axis and the y-axis are perpendicular to each other and the z-axis is perpendicular to the x- and y-axes. In the preferred embodiment, as seen in FIG. 1, the z-axis represents a direction perpendicular to a longitudinal axis of the film 12, the x-axis represents a direction transverse to the longitudinal axis of the film 12 and the y-axis represents a direction parallel to the longitudinal axis of the film 12.

The first flexible member 28 comprises an upright portion 30 and two opposite leg portions 32 extending from and normal to the upright portion 30. The upright portion 30 is attached to a rigid frame 34 within the housing 20 by any conventional means. The upright portion 30 further includes a u-shaped opening 36 which allows the magnetic reading and/or recording element 14 to move in a direction transverse to the longitudinal axis of the film 12. The leg portions 32 are attached to the edge follower 22 by any conventional means. The configuration of the leg portions 32 allow the magnetic reading and/or recording element 14 to rotate about the axis perpendicular to the longitudinal axis of the film 12.

In the preferred embodiment, the first flexible member 28 and a second flexible member 38 operate together to support the magnetic reading and/or recording element 14 for rotation about the z-axis and movement along the x-axis. The movement along the x-axis includes biasing the edge follower 22 towards the longitudinal edge of the film 12.

The second flexible member 38 comprises a central portion 40 and two opposite arm portions 42 extending downward from the central portion 40. The central portion 40 is attached to the rigid frame 34 by any conventional means. The arm portions 42 are attached to the edge follower 22 by any conventional means.

It should be obvious to one skilled in the art that the first and second flexible members can have alternate configurations as long as they support the magnetic reading and/or recording element for rotation about one axis while restraining rotation of the magnetic reading and/or recording element about the other axes and that they support the magnetic reading and/or recording element for movement along one of the axes while restraining the magnetic reading and/or recording element from movement along the other-axes.

The magnetic reading and/or recording apparatus 16 includes a backer device 44 as disclosed in copending U.S. Ser. No. 701,727 filed May 17, 1991 by Weigand et al., the disclosure of which is hereby incorporated by reference. The backer device 44 insures that the magnetic information track maintains constant contact with the magnetic reading and/or recording element 14.

The magnetic reading and/or recording element 15 is attached an edge follower 23 which is connected to the rigid frame 34 by flexible members similar to the first and second flexible members 28 and 38 described above.

The operation of the magnetic reading and/or recording apparatus 16 in accordance with the preferred embodiment will be described referring to FIG. 2A–2C. FIG. 2A shows the film 12 approaching the entrance 18 and the magnetic reading and/or recording apparatus 16. The edge followers 22,23 are initially parallel to the longitudinal axis of the film 12 and in the defined path of the film 12. As the leading edge of the film 21 contacts the edge followers 22,23, the edge followers 22,23 pivot about the pointed ends 26,27 so that they are angled towards the entrance 18 creating a funnel, as best seen in FIG. 2B, for the film to easily enter the magnetic reading and/or recording apparatus 16.

FIG. 2C shows the film 12 and the magnetic reading and/or recording element 14 (not visible) in a reading and/or recording position. The pointed ends 26,27 are no longer contacting the magnetic reading and/or recording element 14 and the edge followers 22,23 are in their variable tracking position contacting opposite longitudinal edges of the film 12 at this time. As the film 12 travels through the magnetic reading and/or recording apparatus 16, the edge followers 22,23 compensate for irregularities in the film edges and film width and the first and second flexible members 28 and 38 allow the magnetic reading and/or recording elements 14,15 to rotate about the axis perpendicular to the longitudinal axis of the film 12 and to move in the direction transverse to the longitudinal axis of the film 12, thus, the magnetic reading and/or recording elements 14,15 will maintain proper registration with the magnetic information track on the film 12.

Furthermore, the magnetic reading and/or recording apparatus described is low cost and easy to manufacture.

The present invention has been described in detail with particular reference to a preferred embodiment thereof, but it will be understood that variations and modification can be effected within the spirit and scope of the invention.

I claim:

1. A magnetic reading and/or recording apparatus for reading and/or recording information on a magnetic information track on a photosensitive medium, said magnetic reading and/or recording apparatus comprising:

a magnetic reading and/or recording element;

a flexible member for supporting said magnetic reading and/or recording element for rotation about an axis perpendicular to a longitudinal axis of a photosensitive medium while restraining said magnetic reading and/or recording element from rotating about an axis parallel to the longitudinal axis of the photosensitive medium and an axis transverse to the longitudinal axis of the photosensitive medium;

means for supporting said magnetic reading and/or recording element for movement in a direction transverse to the longitudinal axis of a photosensitive medium while restraining said magnetic reading and/or recording element from moving in a direction perpendicular to the longitudinal and transverse axes of the photosensitive medium and in a direction parallel to the longitudinal axis of the photosensitive medium, and for supporting said reading and/or recording element for rotation about the axis perpendicular to the longitudinal axis of the photosensitive medium;

a rigid frame;

means connected to said magnetic reading and/or recording element for following a longitudinal edge of a photosensitive medium for maintaining proper registration between said magnetic reading and/or recording element and a magnetic information track on the photosensitive medium; and wherein said flexible member comprises an upright portion attached to said rigid frame and two opposite leg portions extending from and normal to said upright portion, said leg portions are attached to said following means; and said supporting means comprises a central portion attached to said rigid frame and two opposite arm portions extending downward from said central portion, said arm portions are attached to said following means.

* * * * *